United States Patent [19]

Ohya et al.

[11] Patent Number: 5,262,289
[45] Date of Patent: Nov. 16, 1993

[54] SILVER HALIDE PHOTOGRAPHIC MATERIAL CONTAINING AN ANTIHALATION DYE

[75] Inventors: Kazuko Ohya; Shigeru Ohno, both of Kanagawa, Japan

[73] Assignee: Fuji Photo Film Co., Ltd., Kanagawa, Japan

[21] Appl. No.: 7,280

[22] Filed: Jan. 21, 1993

[30] Foreign Application Priority Data

Jan. 21, 1992 [JP] Japan .................... 4-29051

[51] Int. Cl.$^5$ .................................................. G03C 1/06
[52] U.S. Cl. ............................... 430/522; 430/517
[58] Field of Search ................ 430/510, 512, 522, 591

[56] References Cited

U.S. PATENT DOCUMENTS

| | | | |
|---|---|---|---|
| 3,853,563 | 12/1974 | De Poorter et al. | 430/522 |
| 4,311,787 | 1/1982 | Lematieu et al. | 430/522 |
| 4,359,524 | 11/1982 | Masuta et al. | 430/522 |
| 4,366,221 | 12/1982 | Ohlschlaser et al. | 430/522 |
| 4,440,852 | 4/1984 | Onishi et al. | 430/522 |
| 4,500,531 | 2/1989 | Gakamoto et al. | 430/522 |
| 4,933,268 | 6/1990 | Ohno et al. | 430/522 |

Primary Examiner—Jack P. Brammer
Attorney, Agent, or Firm—Sughrue, Mion, Zinn, Macpeak & Seas

[57] ABSTRACT

A silver halide photographic material comprises at least one compound represented by general formula (I)

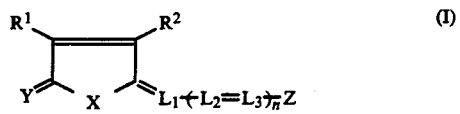

wherein $R^1$ represents an electron withdrawing group; $R^2$ represents a hydrogen atom, a halogen atom, an alkyl group, an aralkyl group, a cycloalkyl group, an aryl group, an alkoxy group, an aryloxy group, an amino group, a hydroxyl group, a carboxyl group, a sulfo group, $-NHSO_2R^3$, $-SO_2R^3$, $-NHCOR^3$, $-NR^3CONR^4R^5$, $-NR^3COOR^4$, $-SO_2NR^3COR^4$ or $-COOR^3$ (in which $R^3$, $R^4$ and $R^5$ each represents a hydrogen atom, an alkyl group, an aralkyl group, a cycloalkyl group or an aryl group); $L^1$, $L^2$ and $L^3$ each independently represents a methine group; X represents a sulfur atom or $NR^6$; Y represents an oxygen atom or $NR^7$ (in which $R^6$ and $R^7$ have the same meaning as $R^3$); Z represents an aryl group or an aromatic heterocyclic group; and n represents an integer of 0, 1 or 2, with the proviso that when X is a sulfur atom, Y is preferably $NR^7$ and when X is $NR^6$, Y is preferably an oxygen atom or $NR^7$.

12 Claims, No Drawings

SILVER HALIDE PHOTOGRAPHIC MATERIAL CONTAINING AN ANTIHALATION DYE

FIELD OF THE INVENTION

The present invention relates to a silver halide photographic material comprising a novel photographic dye.

BACKGROUND OF THE INVENTION

In a silver halide photographic material, the photographic emulsion layer and other hydrophilic colloidal layers are frequently colored for the purpose of absorbing light in a certain wavelength range.

In the case where the spectral composition of the light to be incident upon the photographic emulsion needs to be controlled, a colored layer is normally provided farther from the support than the photographic emulsion layer. Such a colored layer is called a filter layer. If a plurality of photographic emulsion layers are provided, a filter layer may be provided in between these photographic emulsion layers.

For the purpose of inhibiting image unsharpness or halation caused by the second incidence of light which has been scattered during or after the transmission by the photographic emulsion layer and reflected by the interface of the emulsion layer with the support or the surface of the light-sensitive layer opposite the emulsion layer into the photographic emulsion layer, a colored layer called an antihalation layer is normally provided between the photographic emulsion layer and the support or on the side of the support opposite the photographic emulsion layer. In the case where a plurality of photographic emulsion layers are provided, an antihalation layer may be provided between these photographic emulsion layers.

In order to inhibit the reduction in the image sharpness due to the scattering of light in a photographic emulsion layer (generally referred to as "irradiation"), the photographic emulsion layer is often colored.

These hydrophilic colloidal layers to be colored normally comprise a dye. Such a dye must meet the following requirements:

(1) To exhibit a proper spectral absorption corresponding to the purpose;

(2) To be photochemically inert (i.e., to have no adverse chemical effects on the properties of the silver halide photographic emulsion layer, e.g., sensitivity drop, regression of the latent image, fog);

(3) To be insusceptible to discoloration at the photographic processing step or elution with the processing solution or washing water, leaving no harmful coloring on the processed photographic light-sensitive material;

(4) To be nondiffusible from the dyed layer to other layers; and (5) To exhibit an excellent ageing stability in a solution or photographic material and hence be insusceptible to discoloration.

In particular, if the colored layer is a filter layer or an antihalation layer provided on the same side of the support as the photographic emulsion layer, it is often necessary that these layers be selectively colored so that other layers are not substantially colored. Otherwise, these layers not only exert harmful spectral effects on the other layers but also lose their filter or antihalation effects. However, if the layers containing a dye come into wet contact with other hydrophilic colloidal layers, the diffusion of a part of the dye from the former layers to the latter layers often occurs. In order to inhibit such a phenomenon, many efforts have heretofore been made.

For example, a method which comprises allowing a hydrophilic polymer having an electric charge opposite in sign to the charge of a dissociated anionic dye to be present in the layer as a mordant with which the dye molecule interacts so that the dye is localized in a certain layer is disclosed in U.S. Pat. Nos. 2,548,564, 4,124,386, and 3,625,694.

Further, a method which comprises dyeing a certain layer with a water-insoluble dye solid is disclosed in JP-A-56-12639 (the term "JP-A" as used herein means an unexamined published Japanese patent application), 55-155350, 55-155351, 63-27838, and 63-197943, European Patents 15,601, 274,723, 276,566, and 299,435, U.S. Patent 4,803,150, and WO 88/04794.

Moreover, a method which comprises dyeing a certain layer with finely divided metal salt grains having a dye adsorbed thereon is disclosed in U.S. Pat. Nos. 2,719,088, 2,496,841, and 2,496,843, and JP-A-60-45237.

However, even these methods leave much to be desired. These methods are disadvantageous in that they have a low decoloring rate during development and thus cannot always decolor properly when there are alterations in various factors, e.g., expedition of processing and improvements in the composition of the processing solution or the composition of the photographic emulsion.

SUMMARY OF THE INVENTION

It is therefore an object of the present invention to provide a photographic light-sensitive material which comprises a dye that dyes a certain hydrophilic colloidal layer but decolors rapidly during development.

The object of the present invention will become more apparent from the following detailed description and examples.

The object of the present invention is accomplished with a silver halide photographic material, which comprises at least one compound represented by the following general formula (I):

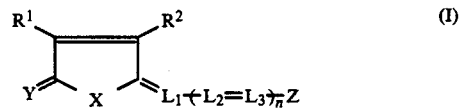

wherein $R^1$ represents an electron withdrawing group; $R^2$ represents a hydrogen atom, a halogen atom, an alkyl group, an aralkyl group, a cycloalkyl group, an aryl group, an alkoxy group, an aryloxy group, an amino group, a hydroxyl group, a carboxyl group, a sulfo group, $-NHSO_2R^3$, $-SO_2R^3$, $-NHCOR^3$, $-NR^3CONR^4R^5$, $-NR^3COOR^4$, $-SO_2NR^3COR^4$ or $-COOR^3$ (in which $R^3$, $R^4$ and $R^5$ each represents a hydrogen atom, an alkyl group, an aralkyl group, a cycloalkyl group or an aryl group); $L^1$, $L^2$ and $L^3$ each independently represents a methine group; X represents a sulfur atom or $NR^6$; Y represents an oxygen atom or $NR^7$ (in which $R^6$ and $R^7$ have the same meaning as $R^3$); Z represents an aryl group or an aromatic heterocyclic group; and n represents an integer of 0, 1 or 2.

DETAILED DESCRIPTION OF THE INVENTION

The compounds represented by general formula (I) will be further described below.

In general formula (I), examples of the electron withdrawing group represented by $R^1$ include $-NO_2$, $-CN$, $-COOR^8$, $-SO_2R^8$, $-CONR^8R^9$, $-CF_3$, $-SO_2NR^8R^9$, $-SOR^8$, $-COR^9$, and an aryl group. The aryl group may be substituted, and is preferably a $C_{6-10}$ aryl group such as phenyl, naphthyl, p-nitrophenyl, p-cyanophenyl or 3,4-dichlorophenyl. $R^8$ and $R^9$ each represents a hydrogen atom, an alkyl group which may be substituted, and is preferably a $C_{1-20}$ alkyl group such as methyl, ethyl, propyl, isopropyl, butyl, t-butyl, hexyl, octyl, decyl, dodecyl, 2-ethylhexyl, carboxymethyl, sulfoethyl or hydroxypropyl), a cycloalkyl group which may be substituted, and is preferably a $C_{3-10}$ cycloalkyl group such as cyclopropyl, cyclopentyl and cyclohexyl), an aryl group which may be substituted, and is preferably a $C_{6-10}$ aryl group such as phenyl, naphthyl, 3-methoxyphenyl, 4-sulfoethoxyphenyl, 4-butanesulfonamidephenyl or 4-N,N-dimethylaminophenyl, or an aralkyl group which may be substituted and is preferably a $C_{7-12}$ aralkyl group such as benzyl, 4-hydroxybenzyl, 4-sulfophenethyl or 3-carboxybenzyl. Preferred among these electron withdrawing groups are $-CN$, $-COOR^8$, $SO_2R^8$, $CONR^8R^9$, and a substituted or unsubstituted aryl group. Particularly preferred examples of the groups of $R^8$ and $R^9$ include a substituted or unsubstituted alkyl group and a substituted or unsubstituted aryl group.

$R^2$ represents a hydrogen atom, a halogen atom (e.g., fluorine, chlorine, bromine, iodine), an alkyl group (where "alkyl group" has the same meaning as stated with regard to $R^8$), an aralkyl group (where "aralkyl group" has the same meaning as stated with regard to $R^8$), a cycloalkyl group (where "cycloalkyl group" has the same meaning as stated with regard to $R^8$), an aryl group (where "aryl group" has the same meaning as stated with regard to $R^8$), an alkoxy group (preferably a $C_{1-10}$ alkoxy group, the alkoxyl group being an alkoxyl group which may be substituted, e.g., methoxy, ethoxy, 4-sulfobutoxy), an aryloxy group (preferably a $C_{6-10}$ aryloxy group, the aryl group being an aryl group which may be substituted, e.g., phenyl, 4-hydroxyphenyl, 4-butanesulfonamidephenyl, naphthyl), an amino group (preferably a $C_{1-10}$ alkylamino group or a $C_{2-20}$ dialkylamino group, e.g., N-methylamino, N-(4-sulfobutyl)amino, N,N-dimethylamino, morpholino, piperidino, pyrrolidino, N-ethyl-N-sulfobutylamino, N-ethyl-N-carboxyethylamino), a hydroxyl group, a carboxyl group, a sulfo group, $-NHSO_2R^3$, $-SO_2R^3$, $-NHCOR^3$, $-NR^3CONR^4R^5$, $-NR^3COOR^4$, $-SO_2NR^3COR^4$ or $-COOR^3$ (in which $R^3$, $R^4$ and $R^5$ each has the same meaning as $R^8$, that is, each independently represents a hydrogen atom, an alkyl group, an aralkyl group, a cycloalkyl group or an aryl group)

Particularly preferred examples of the group of $R^2$ include an alkyl group, an aryl group and an aralkyl group, which may be substituted, and a hydroxyl group.

Where $R^2$ is a carboxyl groups or a sulfo group, the carboxyl group and the sulfo group may be not only in the form of a free acid but may also be in the form of a salt (e.g., $Li^+$, $Na^+$, $K^+$, $NH_4^+$, triethyl ammonium, pyridinium).

$L^1$, $L^2$ and $L^3$ each independently represents a substituted or unsubstituted methine group. Examples of substituents to be incorporated in the substituted methine group include an alkyl group, an aralkyl group, a cycloalkyl group, an aryl group, a carboxyl group, and a cyano group. The alkyl group, aralkyl group, cycloalkyl group and aryl group have the same meaning as stated with regard to $R^8$. X represents a sulfur atom or $NR^6$, and Y represents an oxygen atom or $NR^7$ (in which $R^6$ and $R^7$ have the same meaning as $R^8$). Particularly preferred examples of the groups of $R^6$ and $R^7$ include a hydrogen atom, a substituted or unsubstituted alkyl group and a substituted or unsubstituted aryl group. Preferably, when X is a sulfur atom, Y is $NR^7$. On the other hand, when X is $NR^6$, Y is preferably an oxygen atom or $NR^7$.

Z represents an aryl group (where "aryl group" has the same meaning as stated with regard to $R^8$) or an aromatic heterocyclic group (preferably a 5- or 6-membered ring which may form a condensed ring with other rings, e.g., furan, pyrrole, thiophene, pyridine, imidazole, indole, pyrazole, coumarin) which may contain substituents. Examples of such substituents include those described with reference to $R^2$. These substituents may be connected to each other to form a ring (e.g., tetrahydroquinoline ring, julolidine ring).

The suffix n represents an integer of 0, 1 or 2.

Specific examples of the dyes represented by general formula (I) will be given below, but the present invention should not be construed as being limited thereto.

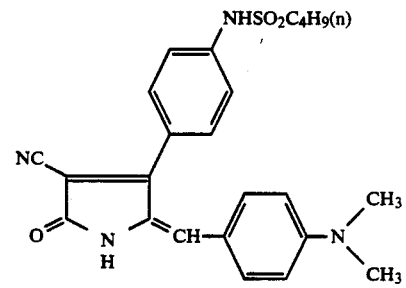

1.

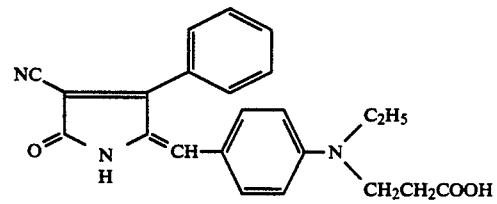

2.

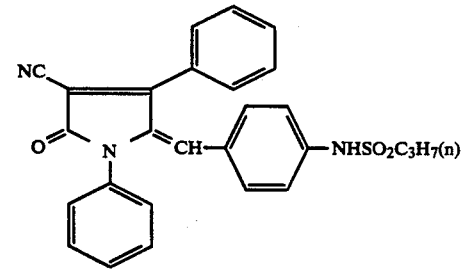

3.

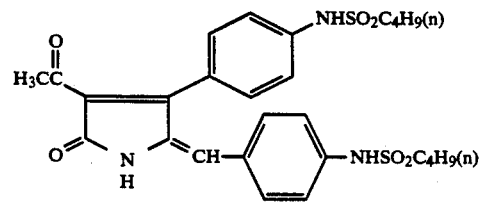

4.

5.
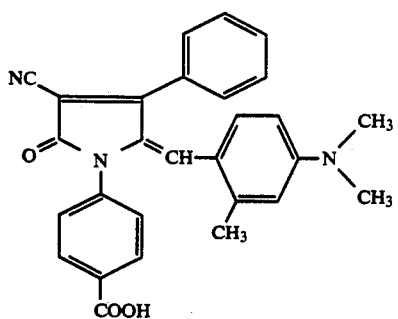
11.
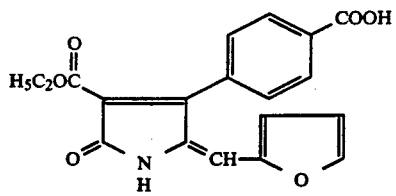
6.
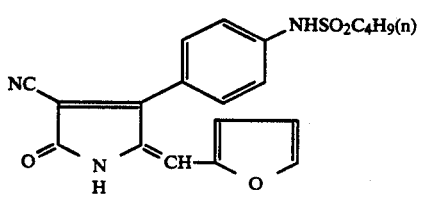
12.
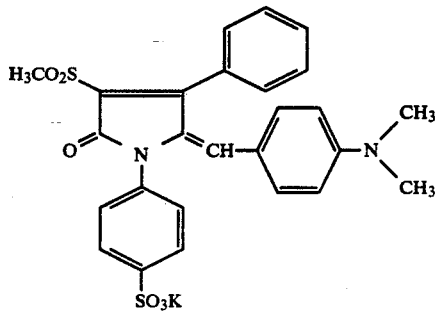
7.
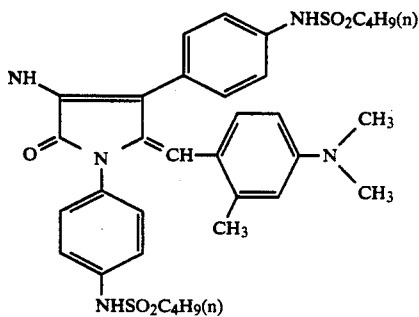
13.
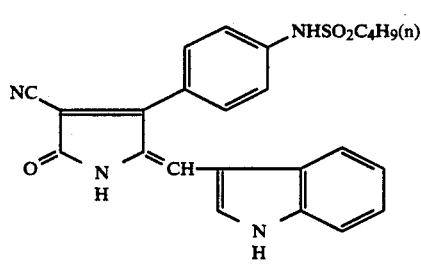
8.
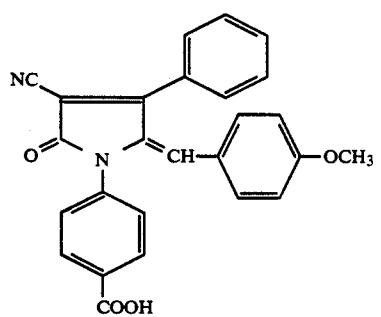
14.
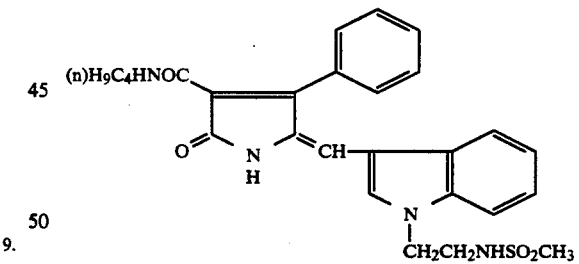
9.
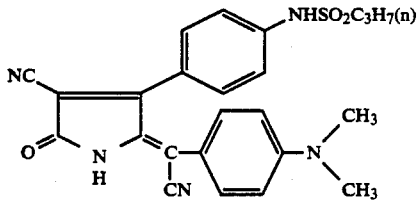
15.
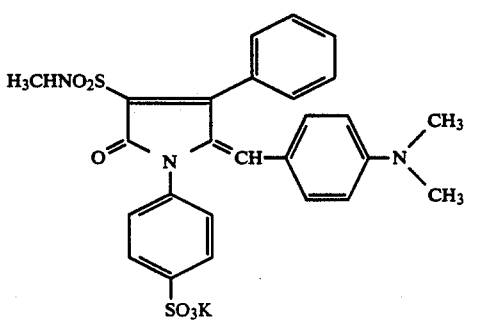
10.
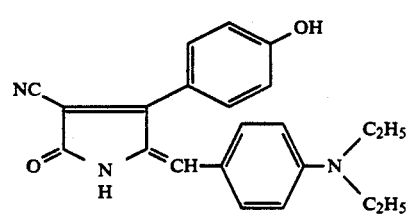
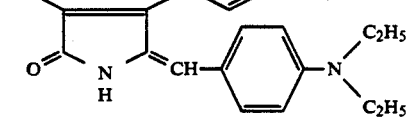

16. 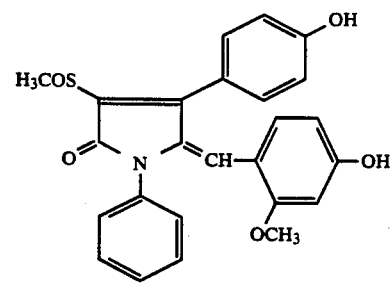
17. 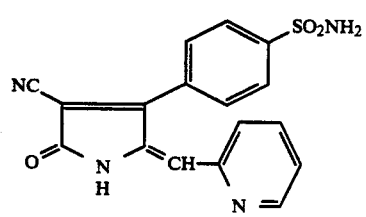
18. 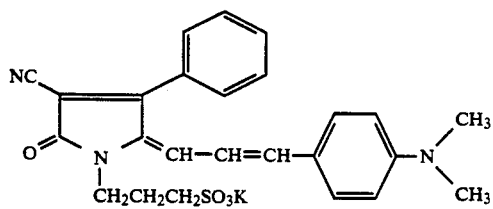
19. 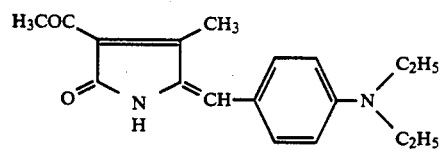
20. 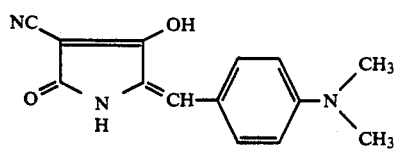
21. 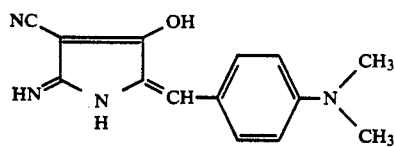
22. 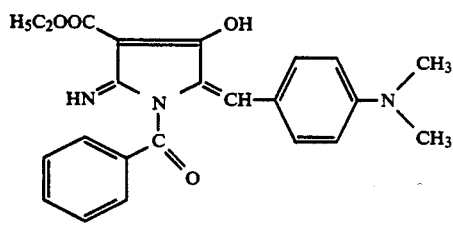
23. 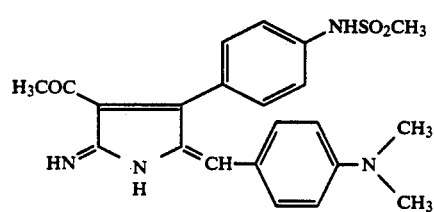
24. 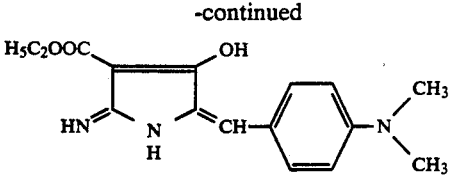
25. 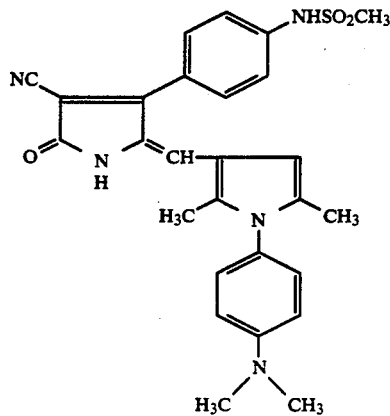
26. 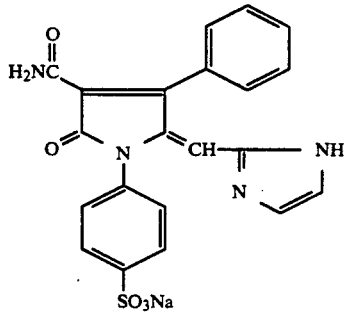
27. 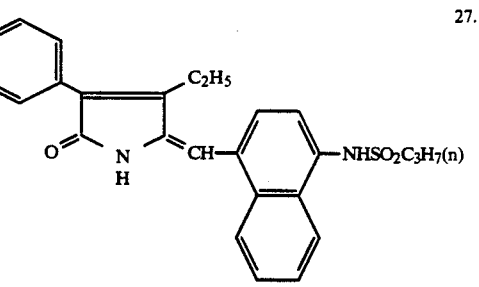
28. 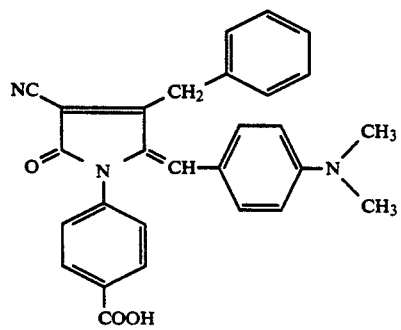

-continued
29. 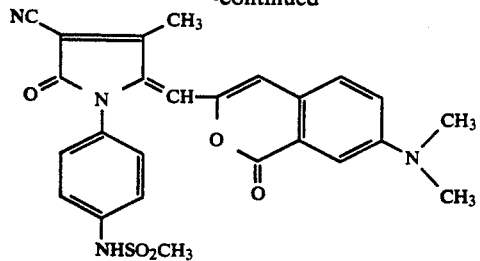
30. 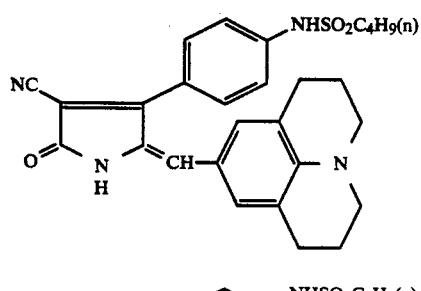
31. 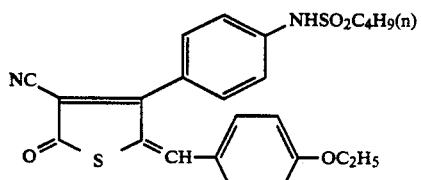
32. 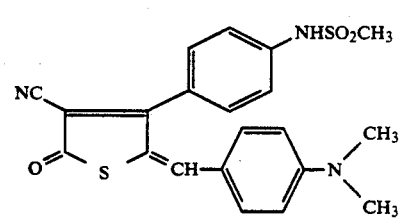
33. 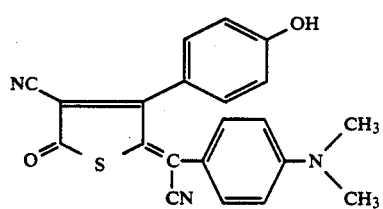
34. 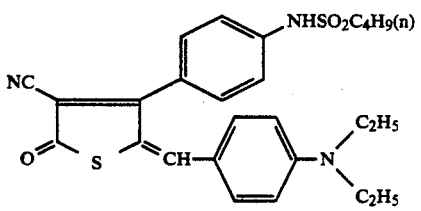
35. 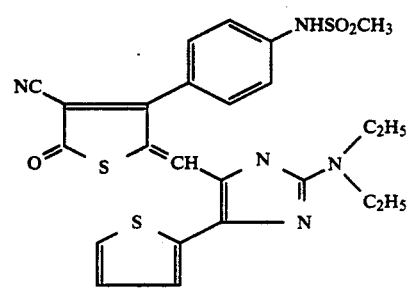
-continued
36. 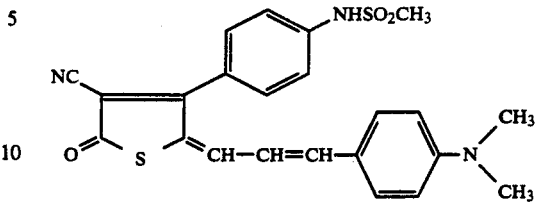
37. 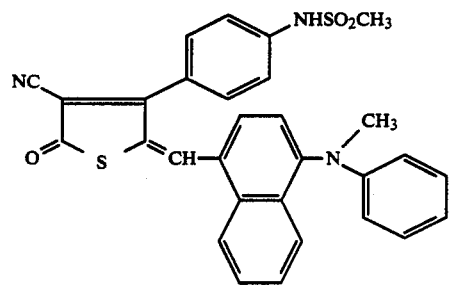
38. 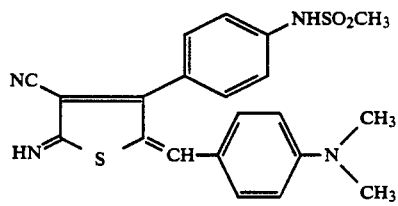
39. 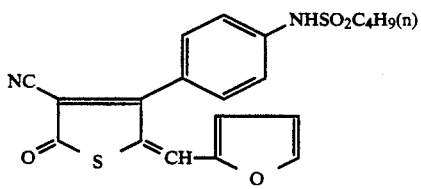
40. 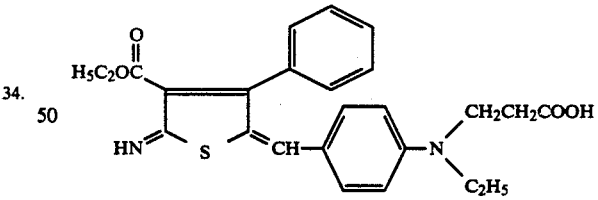
41. 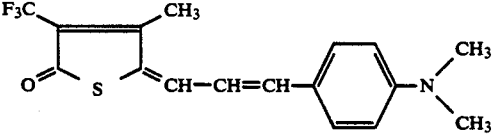
42. 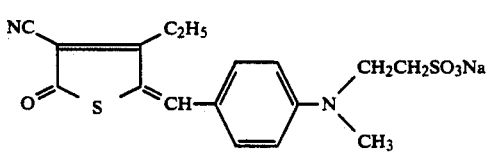

-continued

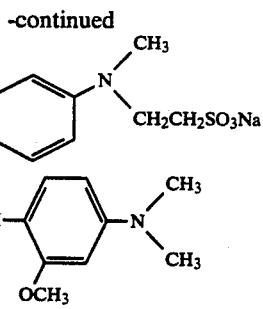

43.

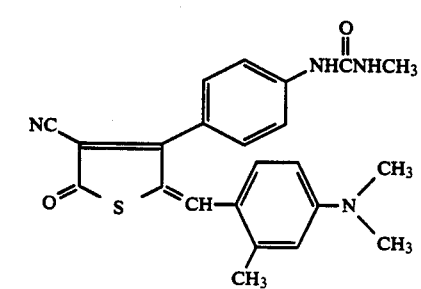

44.

Among the exemplary compounds, Compounds 1 to 30 and 40 are particularly preferred.

The dye represented by general formula (I) may be synthesized, for example, by condensation reaction between an acid nucleus of general formula (II) and a formyl compound of general formula (III):

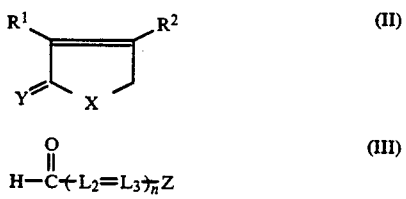

wherein $R^1$, $R^2$, $L_2$, $L_3$, X, Y, Z and n are the same as in general formula (I).

The dye represented by general formula (I) may be incorporated in any one or more of the emulsion layer and other hydrophilic colloidal layers (e.g., interlayer, protective layer, antihalation layer, filter layer).

The dye represented by general formula (I) can be used in any effective amount and is preferably used in such an amount that the optical density is 0.05 to 3.0 per one side of the photographic material. The amount of the dye represented by general formula (I) to be added is preferably 0.5 mg/m² to 1,000 mg/m², more preferably 1 mg/m² to 500 mg/m² per one side of the photographic material. The dye may be added to the system in any step before coating.

The dye represented by general formula (I) can be incorporated in the hydrophilic colloidal layer constituting the silver halide photographic material by any known method. Examples of such methods will be given below. 1. A method which comprises dissolving or dispersing fine solid grains of the dye of the present invention directly in an emulsion layer or hydrophilic colloidal layer or incorporating the dye of the present invention in an hydrophilic colloidal layer in the form of a solution or dispersion in an aqueous solution or a solvent immiscible with water. 2. A method which comprises allowing a hydrophilic polymer having an electric charge opposite in sign to the charge on a dye ion to be present in the layer as a mordant with which the dye molecule interacts so that the dye is localized in the certain layer (Examples of the polymer mordant include polymers containing secondary and tertiary amino groups, polymers containing nitrogen-containing heterocyclic portion, and polymers containing quaternary cationic groups thereof, preferably having a molecular weight of 5,000 or more, particularly 10,000 or more). 3. A method which comprises dissolving the compound in the presence of a surface active agent.

Examples of useful surface active agents include oligomeric and polymeric surface active agents.

Among these methods, the dye of the present invention is most preferably used in the form of a fine solid dispersion.

The fine solid dispersion of the dye of the present invention represented by general formula (I) can be prepared by a known grinding method (e.g., ball mill, vibration ball mill, plaretary ball mill, sand mill, colloid mill, jet mill, roller mill) in the presence of a dispersant. In this case, a solvent (e.g., water, alcohol) may be present.

Various dispersants as described in Bunsangijutu Sougo Siryousyu (Dispersing Technique General Materials), published by Management Development Center Publication Division, pages 255 to 257 and 501 to 539 can be used. Particularly preferred examples for the photographic material of the present invention include non-ionic surfactants such as saponin (steroid based), alkylene oxide derivatives (for example, polyethylene glycol, polyethylene glycol/polypropylene glycohol condensate, polyethylene glycol alkyl ethers or polyethylene glycol alkyl aryl ethers, ethylene glycol esters, polyethylene glycol sorbitan esters, polyalkylene glycol alkyl amines or amides and poly(ethylene oxide) adducts of silicones), glycidol derivatives (for example, alkenylsuccinic acid polyglyceride and alkylphenol polyglyceride), fatty acid esters of polyhydric alcohols, alkyl esters of acids, and urethane acids or ethers; anionic surfactants which include acidic groups, such as carboxyl groups, sulfo groups, phospho groups, sulfate ester groups and phosphate ester groups, for example, triterpenoidsaponin, alkylcarboxylates, alkylsulfonates, alkylbenzenesulfonates, polyalkylbenzenesulfates, alkylnaphthalenesulfonates,alkylsulfateesters, alkylphosphate esters, N-acyl-N-alkyltaurines, sulfosuccinate esters, sulfoalkylpolyoxyethylene alkylphenyl esters and polyoxyethylenealkylphosphate esters; amphoteric surfactants, such as amino acids, aminoalkylsulfonic acids, aminoalkyl sulfate or phosphate esters, alkylbetaines, amine imides and amine oxides; and cationic surfactants such as alkylamine salts, aliphatic and aromatic quaternary ammonium salts, heterocyclic quaternary ammonium salts, for example, pyridinium salts and imidazolium salts, and phosphonium salts and sulfonium salts which contain aliphatic or heterocyclic rings. Those described in JP-A-55-36428 and Research Disclosure No. 15162 (November, 1976) can be advantageously used. These dispersants may be used in combination of the two or more.

Alternatively, finely divided grains of the dye of the present invention may be crystallized by adding a poor solvent for the dye to a solution of the dye in a proper solvent, optionally in the presence of a surface active agent for dispersion. Further, microcrystallization may be carried out by controlling the pH value of the system to dissolve the dye, and then changing the pH value of the solution.

The fine solid grains of the dye of the present invention in the dispersion have an average grain diameter of generally from 0.005 to 10 μm, preferably 0.01 to 1 μm, more preferably 0.01 to 0.5 μm. It is preferably from 01 to 0.1 μm in some cases.

A typical example of the hydrophilic colloid is gelatin. Besides gelatin, any hydrophilic colloids which have been heretofore known usable for photography can be used.

The silver halide emulsion to be used in the present invention preferably comprises silver bromide, silver bromoiodide, silver bromochloroiodide, silver bromochloride or silver chloride.

The silver halide grains to be used in the present invention may have regular crystal form such as cubic or octahedral, an irregular crystal form such as spherical or tabular, or a composite crystal form thereof. Alternatively, a mixture of grains having various crystal forms may be used. Regular crystal forms are preferably used.

For silver halide grains, photographic emulsions, preparation methods thereof, binders, protective colloids, film hardeners, sensitizing dyes, stabilizers, fog inhibitors, etc., the contents of JP-A-3-238447 (line 18, lower left column, page 18 - line 17, lower left column, page 20) can be directly applied to the present invention.

The light-sensitive material of the present invention may include one or more kinds of surface active agents for various purposes such as coating aid, antistatic effect, improvement in slipping, emulsion dispersion, prevention of adhesion and improvement in photographic properties (e.g., acceleration of development, high contrast development, sensitization).

The light-sensitive material prepared according to the present invention may include a dye other than the dye of the present invention in a hydrophilic colloidal layer as a filter dye or for the purpose of inhibiting irradiation or halation or various other purposes. As such a dye there can be preferably used an oxonol dye, a hemioxonol dye, a styryl dye, a melocyanine dye, an anthraquinone dye or an azo dye. Besides these dyes, a cyanine dye, an azomethine dye, a triarylmethane dye, and a phthalocyanine dye are useful. These dyes may be added in the form of an aqueous solution if they are water-soluble. If they are difficultly soluble in water, they may be added in the form of a fine solid dispersion. An oil-soluble dye may be incorporated in a hydrophilic colloid layer in the form of an emulsion obtained by an oil-in-water dispersion method.

For multi-layer multi-color photographic materials, the supports, methods for coating of photographic emulsion layers, exposure means for light-sensitive materials, photographic processing of light-sensitive materials, etc., as described in JP-A-3-238447 (line 14, lower right column, page 2013 line 2, upper right column, page 27) can be applied to the present invention.

The present invention will be further described in the following examples, but the present invention should not be construed as being limited thereto.

EXAMPLE 1

Preparation of Tabular Grains

To a solution obtained by adding 6 g of potassium bromide and 7 g of gelatin to 1 l of water and keeping the material at a temperature of 55 ° C. were added 37 cc of an aqueous solution of silver nitrate (silver nitrate content: 4.00 g) and 38 cc of an aqueous solution containing 5.9 g of potassium bromide by a double jet process in 37 seconds. To the material was added 18.6 g of gelatin. The material was then heated to a temperature of 70 ° C. 89 cc of an aqueous solution of silver nitrate (silver nitrate content: 9.8 g) was then added to the material in 22 minutes. To the material was added 7 cc of a 25% aqueous solution of ammonia. The material was subjected to physical ripening for 10 minutes keeping the temperature. 6.5 cc of a 100% acetic acid solution was then added to the material. Subsequently, an aqueous solution of 153 g of silver nitrate and an aqueous solution of potassium bromide were added to the material by a controlled double jet process for 35 minutes while the pH value of the system was maintained at 8.5. To the material was then added 15 cc of a 2N potassium thiocyanate solution. The material was subjected to physical ripening for 5 minutes while maintaining the temperature at 70° C., and then cooled to a temperature of 35 ° C. As a result, a monodisperse emulsion of tabular grains of pure silver bromide having an average diameter of 1.10 μm as calculated in terms of projected area, a thickness of 0.165 μm and a diameter fluctuation coefficient of 18.5% was obtained.

Soluble salts were then removed from the emulsion by a sedimentation method. The emulsion was heated to a temperature of 40 ° C. and 30 g of gelatin, 2.35 g of phenoxyethanol and 0.8 g of sodium polystyrenesulfonate as a thickening agent were then added thereto. The emulsion was then adjusted to a pH value of 5.90 and a pAg value of 8.25 with caustic soda and a silver nitrate solution.

The emulsion was then subjected to chemical sensitization at a temperature of 56 ° C. with stirring.

0.043 mg of thiourea dioxide was added to the emulsion which was then allowed to stand for 22 minutes for reduction sensitization. Subsequently, 20 mg of 4-hydroxy-6-methyl-1,3,3a,7-tetrazaindene and 400 mg of a sensitizing dye having the following chemical structure:

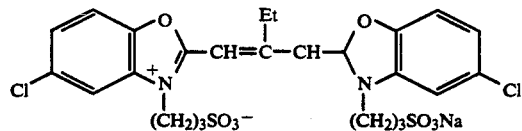

were added to the emulsion. Further, 0.83 g of calcium chloride was added to the emulsion. Subsequently, 1.3 mg of sodium thiosulfate, 2.7 mg of Slenium Compound (1) having the following chemical structure, 2.6 mg of chloroauric acid, and 90 mg of potassium thiocyanate were added to the emulsion which was then cooled to a temperature of 35° C. after 40 minutes.

Thus, tabular grains T-1 were prepared.

Selenium Compound (1)

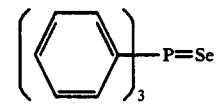

Preparation of Coating Solution for Emulsion Layer

The following chemicals were added in the following amounts per mole of silver halide to T-1 to prepare a coating solution for an emulsion layer.

| | |
|---|---|
| Gelatin (including gelatin in the emulsion) | 65.6 g |
| Trimethylolpropane | 9 g |
| Dextran (average molecular weight: 39,000) | 18.5 g |
| Sodium polystyrenesulfonate (average molecular weight: 600,000) | 1.8 g |
| Film hardener (1,2-bis (vinylsulfonylacetamide) ethane) (Amount adjusted such that the percent swelling* was 230%) | |
| 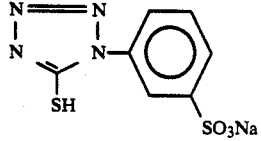 | 34 mg |
| 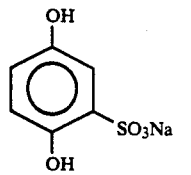 | 4.8 g |

*The measurement of the percent swelling was carried out using photographic materials which were not subject to photographic processing and stored for 7 days (including 3 days' incubation under 38° C. and 50 RH %) after coating. The percent swelling means the value obtained by (the total thickness of the hydrophilic colloid layers after being immersed in a distilled water at 21° C. for 3 minutes/that before being immersed) × 100 (%). The measurement of the thickness was carried out by observing the cross section of a sample frozen in liquid nitrogen using a scanning electron microscope equipped with a liquid nitrogen stage.

A surface protective layer composition was prepared as follows:

| Component of surface protective layer composition | Coated amount |
|---|---|
| Gelatin | 0.996 g/m² |
| Sodium polyacrylate (average molecular weight: 400,000) | 0.023 g/m² |
| 4-Hydroxy-6-methyl-1,3,3a,7-tetrazaindene | 0.015 g/m² |
| $C_8H_{17}$—⟨⟩—$(OCH_2CH_2)_3SO_3Na$ | 0.013 g/m² |
| $C_{16}H_{33}O(CH_2CH_2O)_{10}H$ | 0.045 g/m² |
| $C_{17}H_{33}CONCH_2CH_2SO_3Na$<br>  \|<br>  $CH_3$ | 0.0065 g/m² |
| $C_8F_{17}SO_2N(CH_2CH_2O)_{15}H$<br>  \|<br>  $C_3H_7$ | 0.003 g/m² |
| $C_8F_{17}SO_2N(CH_2CH_2O)_4(CH_2)_4SO_3Na$<br>  \|<br>  $C_3H_7$ | 0.001 g/m² |

| Component of surface protective layer composition | Coated amount |
|---|---|
| 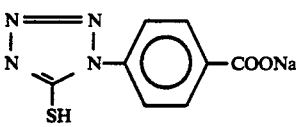 | 1.7 mg/m² |
| Polymethyl methacrylate (average grain diameter: 3.7 μm) | 0.087 g/m² |
| Proxel (pH adjusted to 7.4 with NaOH) | 0.0005 g/m² |

Preparation of Support (1) Preparation of undercoating layer Dye Dispersion D-1

Dye (I-2) of the present invention was subjected to treatment by a ball mill according to the following method.

434 ml of water and 791 ml of a 6.7% aqueous solution of Triton X-200 surface active agent (TX-200) were charged into a 2-ml ball mil. 20 g of Dye (I-2) were added to the solution. 400 ml of beads of zirconium oxide (ZrO) (diameter: 2 mm) were added to the solution. The material was ground for 4 days. 160 g of 12.5% gelatin was then added to the material. After being defoamed, the material was filtered to remove the ZrO beads therefrom. The dye dispersion thus obtained was observed. The dye grains were found to have a wide diameter. distribution over the range from 0.05 μm to 1.15 μm and an average grain diameter of 0.37 μm.

The dye grains were then subjected to centrifugal separation to remove dye grains having a diameter of 0.9 μm or more.

Thus, Dye Dispersion D-1 was obtained.

(2) Preparation of Support

A 183-μm thick biaxially-oriented polyethylene terephthalate film was subjected to corona discharge treatment. A first undercoating solution having the composition described below was coated on one side of the polyethylene terepthalate film by means of a wire bar coater in an amount of 5.1 cc/m², and then dried at a temperature of 175 ° C. for 1 minute to provide a first undercoating layer.

A first undercoating layer was also similarly provided on the opposite side of the support. The polyethylene terephthalate used contained a dye having the following chemical structure in an amount of 0.04 wt.%.

Dye

-continued

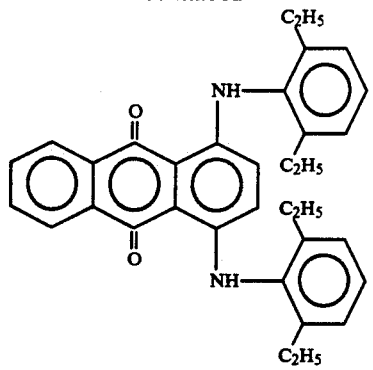

| Composition of first undercoating solution | |
|---|---|
| Butadiene-styrene copolymer latex solution* (solids content 40%; butadiene/styrene weight proportion = 31/69) | 79 cc |
| 4% solution of a sodium salt of 2,4-dichloro-6-hydroxy-s-triazine | 20.5 cc |
| Distilled water | 900.5 cc |

*The latex solution contained as an emulsion dispersant

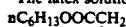
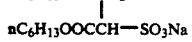

in an amount of 0.4 wt. % based on the latex solids content.

Onto the first undercoating layer on the both sides of the support were coated a second undercoating solution having the following composition by means of a wire bar coater in an amount described below. The second undercoating layer solution dried at a temperature of 150° C. to provide a second undercoating layer.

| Composition of second undercoating solution | |
|---|---|
| Gelatin | 160 mg/m² |
| Dye dispersion D-1 (dye solids content: 35 mg/m²) | |
| $C_9H_{19}$—⟨phenyl⟩—O—$(CH_2CH_2O)_nH$  (n = 8.5) | 8 mg/m² |
| ⟨benzothiazolinone⟩ | 0.27 mg/m² |
| Matting agent (polymethyl methacrylate having an average grain diameter of 2.5 μm) | 2.5 mg/m² |

Preparation of Photographic Material

Onto the both sides of the support thus prepared were coated the previously prepared coating solution for an emulsion layer and the surface protective layer composition by a simultaneous extrusion method to prepare Photographic Material 1—1. Further, Photographic Materials 1—2 to 1—7 were prepared in the same manner as Photographic Material 1—1 except that the fine solid dispersion to be incorporated in the second undercoating layer was altered to the dyes as set forth in Table 1.

The amount of silver coated per side of the support was 1.75 g/m².

TABLE 1

| Photographic Material | Dye | Coated amount per side of the support |
|---|---|---|
| 1-1 (Invention) | 1 | 35 mg/m² |
| 1-2 (Invention) | 2 | 35 |
| 1-3 (Invention) | 6 | 35 |
| 1-4 (Invention) | 8 | 35 |
| 1-5 (Comparison) | Comparative Dye 1 | 35 |
| 1-6 (Comparison) | Comparative dye 2* | 35 |
| 1-7 (Comparison) | — | — |

*Comparative Dye 2 was uniformly dissolved during dispersion.
Comparative Dye 1
(Compound described in JP-A-64-40827)

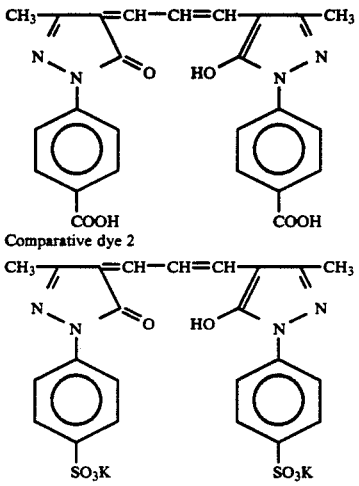

Comparative dye 2

Evaluation of Photographic Properties

A GRENEX ortho screen HR-4 manufactured by Fuji Photo Film Co., Ltd. was tightly contacted to one side of each Photographic Material specimen with the aid of a cassette and the Photographic Material specimen Nos. 1—1 to 1—7 were subject to a X-ray sensitometry. The adjustment of exposure was carried out by changing the distance between the X-ray tube and the casette. After being exposed to light, the Photographic Material specimens were developed with the following developer and fixing solution by means of an automatic processor. The sensitivity of each specimen was determined relative to the sensitivity of Photographic Material specimen No. 1—7, taking the sensitivity of this specimen as 100.

Measurement of Sharpness (MTF)

MTF with the casette (with an HR-4 screen put on both sides thereof) and the automatic processor in combination was measured. The measurement was conducted through a 30 μm×500 μm aperture. The MTF value at a spatial frequency of 1.0 cycle/mm on the portion having an optical density of 1.0 was used for evaluation.

Measurement of Residual Color

The unexposed film was subjected to the above mentioned automatic development, and then measured for green transmission density through a Macbeth status A filter. On the other hand, a blue-dyed polyethylene terephthalate support which had not been undercoated was measured for green transmission density. The latter value was subtracted from the former value to obtain a net value to be evaluated as residual color density.

The automatic processor used in this experiment was a remodelled version of a Type FPM-9000 automatic processor available from Fuji Photo Film Co., Ltd. In this remodelled version, infrared drying was used in the drying zone. The processing steps are set for in Table 2. The daily amount of light-sensitive material to be process is about 200 sheets as calculated in terms of 10×20 inch paper.

TABLE 2

| Processing step | Processing tank capacity | Processing temperature | Processing path length | Processing time |
|---|---|---|---|---|
| Development | 15 l | 35° C. | 613 mm | 8.8 sec. |
| | (liquid surface area/processing tank capacity ratio = 25 cm²/l) | | | |
| Fixing | 15 l | 32° C. | 539 mm | 7.7 sec. |
| Rinse | 13 l | 17° C. (running water) | 263 mm | 3.8 sec. |
| Squeeze | | | 304 mm | 4.4 sec. |
| Drying | | 58° C. | 368 mm | 5.3 sec. |
| Total | | | 2,087 mm | 30.0 sec. |

| Development Preparation of concentrated solution (Developer) | | |
|---|---|---|
| Part A | | |
| Potassium hydroxide | 330 | g |
| Potassium sulfite | 630 | g |
| Sodium sulfite | 255 | g |
| Potassium carbonate | 90 | g |
| Boric acid | 45 | g |
| Diethylene glycol | 180 | g |
| Diethylenetriaminepentaacetic acid | 30 | g |
| 1-(N,N-diethylamino)ethyl-5-mercaptotetrazole | 0.75 | g |
| Hydroquinone | 450 | g |
| 4-Hydroxymethyl-4-methyl-1-phenyl-3-pyrazolidone | 40 | g |
| Water to make | 4,125 | ml |
| Part B | | |
| Diethylene glycol | 525 | g |
| 3-3'-dithiobishydrocinnamic acid | 3 | g |
| Glacial acetic acid | 102.6 | g |
| 5-Nitroindazole | 3.75 | g |
| 1-Phenyl-3-pyrazolidone | 65 | g |
| Water to make | 750 | ml |
| Part C | | |
| Glutaraldehyde (50 wt/wt %) | 150 | g |
| Potassium bromide | 15 | g |
| Potassium metabisulfite | 105 | g |
| Water to make | 750 | ml |
| Fixing solution | | |
| Ammonium thiosulfate (70 wt/vol %) | 3,000 | ml |
| Disodium ethylenediaminetetraacetate dihydrate | 0.45 | g |
| Sodium sulfite | 255 | g |
| Boric acid | 60 | g |
| 1-(N,N-dimethylamino)-ethyl-5-mercaptotetrazole | 15 | g |
| Tartaric acid | 48 | g |
| Glacial acetic acid | 675 | g |
| Sodium hydroxide | 225 | g |
| Sulfuric acid (36 N) | 58.5 | g |
| Aluminum sulfate | 150 | g |
| Water to make | 600 | ml |
| pH | 4.68 | |

Preparation of Processing Solution

The above mentioned concentrated developer was packed into the following container for each part. In this container, the portions for the Parts A, B and C were connected to each other.

The above mentioned concentrated fixing solution was similarly packed into the same kind of container.

300 ml of an aqueous solution containing 54 g of acetic acid and 55.5 g of potassium bromide was charged into the development tank as a starter.

The containers filled with these processing agents were then pushed against a piercing blade in processing solution stock tanks mounted on the side of the automatic processor so that a sealing membrane on the cap thereof was broken to allow their contents to be charged into the stock tanks.

These processing agents were delivered to the development tank and the fixing tank in the automatic processor in the following proportions by means of the respective pump provided in the automatic processor.

Each time the light-sensitive material was processed in an amount of 8 sheets as calculated in terms of a 10×20 inch paper, the processing tanks were each replenished by a mixture of these processing agents and water in the same proportions.

| Developer | |
|---|---|
| Part A | 55 ml |
| Part B | 10 ml |
| Part C | 10 ml |
| Water | 125 ml |
| pH | 10.50 |
| Fixing solution | |
| Concentrated solution | 80 ml |
| Water | 120 ml |
| pH | 4.62 |

TABLE 3

| Photographic material | Dye | Relative sensitivity (front surface) | MTF | Residual color |
|---|---|---|---|---|
| 1-1 (Invention) | No. 1 | 100 | 0.56 | 0.01 |
| 1-2 (Invention) | 2 | 100 | 0.55 | 0.01 |
| 1-3 (Invention) | 6 | 100 | 0.56 | 0.01 |
| 1-4 (Invention) | 8 | 100 | 0.55 | 0.01 |
| 1-5 (Comparison) | Comparative Dye 1 | 88 | 0.55 | 0.03 |
| 1-6 (Comparison) | Comparative Dye 2 | 80 | 0.56 | 0.03 |
| 1-7 (Comparison) | — | 100 | 0.42 | 0.00 |

Table 3 shows that as compared with the comparative dyes, the use of the dyes of the present invention provide a photographic material which exhibits less sensitivity drop, excellent sharpness and less residual color.

EXAMPLE 2

Preparation of Specimens

Silver halide photographic material specimens were prepared in the same manner as described in JP-A-2-282244 (line 11, lower left column, page 35—line 15, lower right column, page 46) except that Dye I-5 (0.2 g/m²) described in line 3, lower left column, on page 45 of the above cited published patent application was replaced by Dye 1 of the present invention 0.1 g/m²) and Dye 4 of the present invention (0.1 g/m²) at the same time; Dye I-7 described in last line 1, lower left column, on page 45 of the above cited published patent application was replaced by Dye 4 of the present invention (0.1 g/m²) and Dye 7 of the present invention (0.1 g/m²) at the same time; and Dyes I-7 and I-28 described from line 4 to line 5, lower right column, on page 45 of the above cited published patent application were replaced by Dye 5 of the present invention (0.1 g/m²) and Dye 11 of the present invention (0.1 g/m²) at the same time.

These specimens were then subjected to sensitometry. The results are set forth in Table 4.

TABLE 4

| Specimen No. | Compound used | Relative sensitivity (cyan) | Fog in red-sensitive layer | Residual color after processing (cyan)* | Amount of residual silver on unexposed portion (μg/cm²) |
|---|---|---|---|---|---|
| 601 (Comparison) | Black colloidal silver | 100 | 0.05 | 0.03 | 3.9 |
| 602 (Invention) | Compound 1 of the present invention and Compound 4 of the present invention | 107 | 0 | 0 | 1.9 |
| 603 (Invention) | Compound 4 of the present invention and Compound 7 of the present invention | 110 | 0 | 0 | 1.9 |
| 604 (Invention) | Compound 5 of the present invention and Compound 11 of the present invention | 105 | 0 | 0 | 1.8 |
| 605 (Comparison) | Comparative Compound 6-1 | 75 | 0.03 | 0.01 | 2.1 |

*Residual color after processing: (Dmin (minimum density) obtained by the processing according to the present example) - (Dmin obtained by further processing with 30 g/l sodium sulfite for 10 minutes)

Table 4 shows that the incorporation of a fine solid dispersion of a compound of the present invention in the antihalation layer provided a color photographic light-sensitive material which exhibits little sensitivity drop, no fog or residual color after processing, and less residual silver.

While the invention has been described in detail and with reference to specific embodiments thereof, it will be apparent to one skilled in the art that various changes and modifications can be made therein without departing from the spirit and scope thereof.

What is claimed is:

1. A silver halide photographic material, which comprises a support having provided thereon at least one silver halide emulsion layer and optionally one or more hydrophilic colloid layers, and at least one dye compound represented by general formula (I):

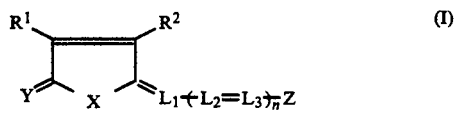

wherein $R^1$ represents an electron withdrawing group; $R^2$ represents a hydrogen atom, a halogen atom, a substituted or unsubstituted alkyl group, a substituted or unsubstituted aralkyl group, a substituted or unsubstituted cycloalkyl group, a substituted or unsubstituted aryl group, a substituted or unsubstituted alkoxy group, a substituted or unsubstituted aryloxy group, an amino group, a hydroxyl group, a carboxyl group, a sulfo group, $-NHSO_2R^3$, $-SO_2R^3$, $-NHCOR^3$, $-NR^3CONR^4R^5$, $-NR^3COOR^4$, $-SO_2NR^4COR^4$ or $-COOR^3$; $R^3$, $R^4$ and $R^5$ each represents a hydrogen atom, a substituted or unsubstituted alkyl group, a substituted or unsubstituted aralkyl group, a substituted or unsubstituted cycloalkyl group or a substituted or unsubstituted aryl group, $L^1$, $L^2$ and $L^3$ each independently represents a methine group which may be substituted; X represents a sulfur atom or $NR^6$; Y represents an oxygen atom or $NR^7$; $R^6$ and $R^7$ have the same meaning as $R^3$; Z represents a substituted or unsubstituted aryl group or a substituted or unsubstituted aromatic heterocyclic group, and n represents an integer of 0, 1 or 2.

2. The silver halide photographic material of claim 1, wherein X in general formula (I) represents a sulfur atom and Y in general formula (I) represents $NR$;.

3. The silver halide photographic material of claim 1, wherein X in general formula (I) represents $NR^6$ and Y in general formula (I) represents an oxygen atom or $NR^7$.

4. The silver halide photographic material of claim 1, where $R^1$ is selected from the group consisting of $-NO_2$, $-CN$, $-COOR^8$, $-SO_2R^8$, $-CONR^8R^9$, $-CF_3$, $-SO_2NR^8R^9$, $-SOR^8$, $-COR^9$, and a substituted or unsubstituted aryl group, where $R^8$ and $R^9$ each independently represents a hydrogen atom, a substituted or unsubstituted alkyl group, a substituted or unsubstituted cycloalkyl group, a substituted or unsubstituted aryl group, or a substituted or unsubstituted aralkyl group.

5. The silver halide photographic material of claim 4, where $R^1$ is selected from the group consisting of $-CN$, $COOR^8$, $-SO_2R^8$, $-CONR^8R^9$, and a substituted or unsubstituted aryl group.

6. The silver halide photographic material of claim 1, in which the dye of formula (I) is incorporated in an emulsion layer.

7. The silver halide photographic material of claim 1, in which the dye of formula (I) is incorporated in a hydrophilic colloid layer.

8. The silver halide photographic material of claim 1, wherein the amount of the dye of formula (I) is from 0.5 to 1,000 mg/m² per one side of the photographic material.

9. The silver halide photographic material of claim 8, wherein the amount of the dye of formula (I) is from 1 to 500 mg/m² per one side of the photographic material.

10. The silver halide photographic material of claim 1, wherein the dye of formula (I) is dispersed in an emulsion layer or other hydrophilic colloid layer in the form of a dispersion of fine solid dye grains.

11. The silver halide photographic material of claim 10, wherein the dye grains have an average grain diameter of 0.005 to 10 μm.

12. The silver halide photographic material of claim 10, wherein the dye grains have an average grain diameter of 0.01 to 1 μm.

* * * * *